United States Patent
Hatfield

(10) Patent No.: US 9,921,764 B2
(45) Date of Patent: Mar. 20, 2018

(54) USING INACTIVE COPY RELATIONSHIPS TO RESYNCHRONIZE DATA BETWEEN STORAGES

(71) Applicant: INTERNATIONAL BUSINESS MACHINES CORPORATION, Armonk, NY (US)

(72) Inventor: Brian D. Hatfield, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 14/788,379

(22) Filed: Jun. 30, 2015

(65) Prior Publication Data
US 2017/0003895 A1    Jan. 5, 2017

(51) Int. Cl.
*G06F 3/06* (2006.01)
*G06F 12/00* (2006.01)

(52) U.S. Cl.
CPC ............ *G06F 3/0619* (2013.01); *G06F 3/065* (2013.01); *G06F 3/067* (2013.01)

(58) Field of Classification Search
CPC ...... G06F 3/0683; G06F 3/065; G06F 3/0619; G06F 3/0604
USPC .......................................... 711/162, 156, 114
See application file for complete search history.

(56) References Cited

U.S. PATENT DOCUMENTS

| | | | |
|---|---|---|---|
| 6,035,412 A | 3/2000 | Tamer et al. | |
| 6,578,120 B1 | 6/2003 | Crockett et al. | |
| 6,671,705 B1 * | 12/2003 | Duprey | G06F 11/2058 |
| 7,069,401 B1 * | 6/2006 | Noonan | G06F 11/1461 |
| | | | 707/999.202 |
| 7,461,226 B2 | 12/2008 | Iwamura et al. | |
| 7,603,581 B2 | 10/2009 | Boyd et al. | |
| 7,716,518 B2 | 5/2010 | Butterworth et al. | |
| 7,788,225 B2 | 8/2010 | Fish et al. | |
| 7,895,162 B2 | 2/2011 | Tanaka et al. | |
| 7,979,897 B2 | 7/2011 | Klein et al. | |
| 8,020,037 B1 | 9/2011 | Schwartz et al. | |

(Continued)

OTHER PUBLICATIONS

Y.C. Lien, et al., "Method for Creating Consistent Bitmaps", IBM Corporation, IP.com, Jul. 1, 1990, TDB n2, 07-90, p. 417-421, IP.com No. IPCOM000101300D, electronic publication Mar. 16, 2005.

(Continued)

*Primary Examiner* — Pierre-Michel Bataille
(74) *Attorney, Agent, or Firm* — David W. Victor; Konrad Raynes Davda & Victor LLP.

(57) ABSTRACT

Provided are a computer program product, system, and method for using inactive copy relationships to resynchronize data between storages. A first and second groups of active copy relationships are established to serially copy data among the storages in the first and second groups, respectively. At least one of the storages in both the first group and the second group comprise overlapping storages that are members of both the first and second groups and at least one of the storages in both the first and second groups comprise non-overlapping storages that are a member of only one of the first and second groups. At least one inactive copy relationship is established having as a source storage one of the non-overlapping storages in the first group and as a target storage one of the non-overlapping storages in the second group.

25 Claims, 10 Drawing Sheets

(56) References Cited

U.S. PATENT DOCUMENTS

| | | |
|---|---|---|
| 8,161,256 B2 | 4/2012 | Hara et al. |
| 8,667,033 B1 | 3/2014 | McCline et al. |
| 9,092,449 B2 | 7/2015 | Brown et al. |
| 9,218,252 B1* | 12/2015 | Revur ............... G06F 17/30371 |
| 9,495,409 B1* | 11/2016 | Revur ............... G06F 17/30371 |
| 9,514,013 B2* | 12/2016 | Hatfield ............. G06F 11/2058 |
| 9,514,409 B2 | 12/2016 | Berlandier et al. |
| 9,727,243 B2 | 8/2017 | Hatfield et al. |
| 2005/0050288 A1 | 3/2005 | Takahashi et al. |
| 2006/0143497 A1 | 6/2006 | Zohar et al. |
| 2007/0050547 A1 | 3/2007 | Sano et al. |
| 2007/0198790 A1* | 8/2007 | Asano .................. G06F 3/0605 711/162 |
| 2008/0022058 A1 | 1/2008 | Nadathur et al. |
| 2014/0108345 A1 | 4/2014 | Brown et al. |
| 2014/0156595 A1 | 6/2014 | Rose et al. |
| 2017/0003883 A1 | 1/2017 | Hatfield et al. |

OTHER PUBLICATIONS

U.S. Appl. No. 14/318,395, filed Jun. 27, 2014.
U.S. Appl. No. 14/788,539, filed Jun. 30, 2015.
D. Clitherow, "GDPS Family an Introduction to Concepts and Capabilities", IBM Corporation, Document SG24-6374-09, Aug. 2014, pp. 324.
"Recovery Scenario using Incremental Resynchronization in a Metro/Global Mirror Configuration", IBM Corporation, [online] [retrived Apr. 25, 2015] http://www-01.ibm.com/support/knowledgecenter/api/content/nl/en-us/ . . . , pp. 12.
"Recovery Scenarios for Metro/Global Mirror with Incremental Resync", IBM Corporation, [online] [retrived Apr. 25, 2015] http://www-01.ibm.com/support/knowledgecenter/api/content/nl/en-us/ . . . , pp. 3.
List of Patents or Patent Applications That Are Related, dated Jun. 30, 2015, pp. 2.
U.S. Appl. No. 15/094,051, filed Apr. 8, 2016.
List of IBM Patents or Patent Applications Treated as Related dated Apr. 12, 2016, pp. 2.
Office Action dated Mar. 24, 2016, pp. 17, for U.S. Appl. No. 14/318,395, filed Jun. 27, 2014.
Response dated Jun. 24, 2016, pp. 15, to Office Action dated Mar. 24, 2016, pp. 17, for U.S. Appl. No. 14/318,395, filed Jun. 27, 2014.
Notice of Allowance dated Aug. 12, 2016, pp. 11, for U.S. Appl. No. 14/318,395, filed Jun. 27, 2014.
Office Action dated Oct. 6, 2016, pp. 22, for U.S. Appl. No. 14/788,539, filed Jun. 30, 2015.
Response dated Jan. 6, 2017, pp. 13, to Office Action dated Oct. 6, 2016, pp. 22, for U.S. Appl. No. 14/788,539, filed Jun. 30, 2015.
Notice of Allowance dated Mar. 22, 2017, pp. 9, for U.S. Appl. No. 14/788,539, filed Jun. 30, 2015.

* cited by examiner

Active Copy Relationship

Inactive Copy Relationship

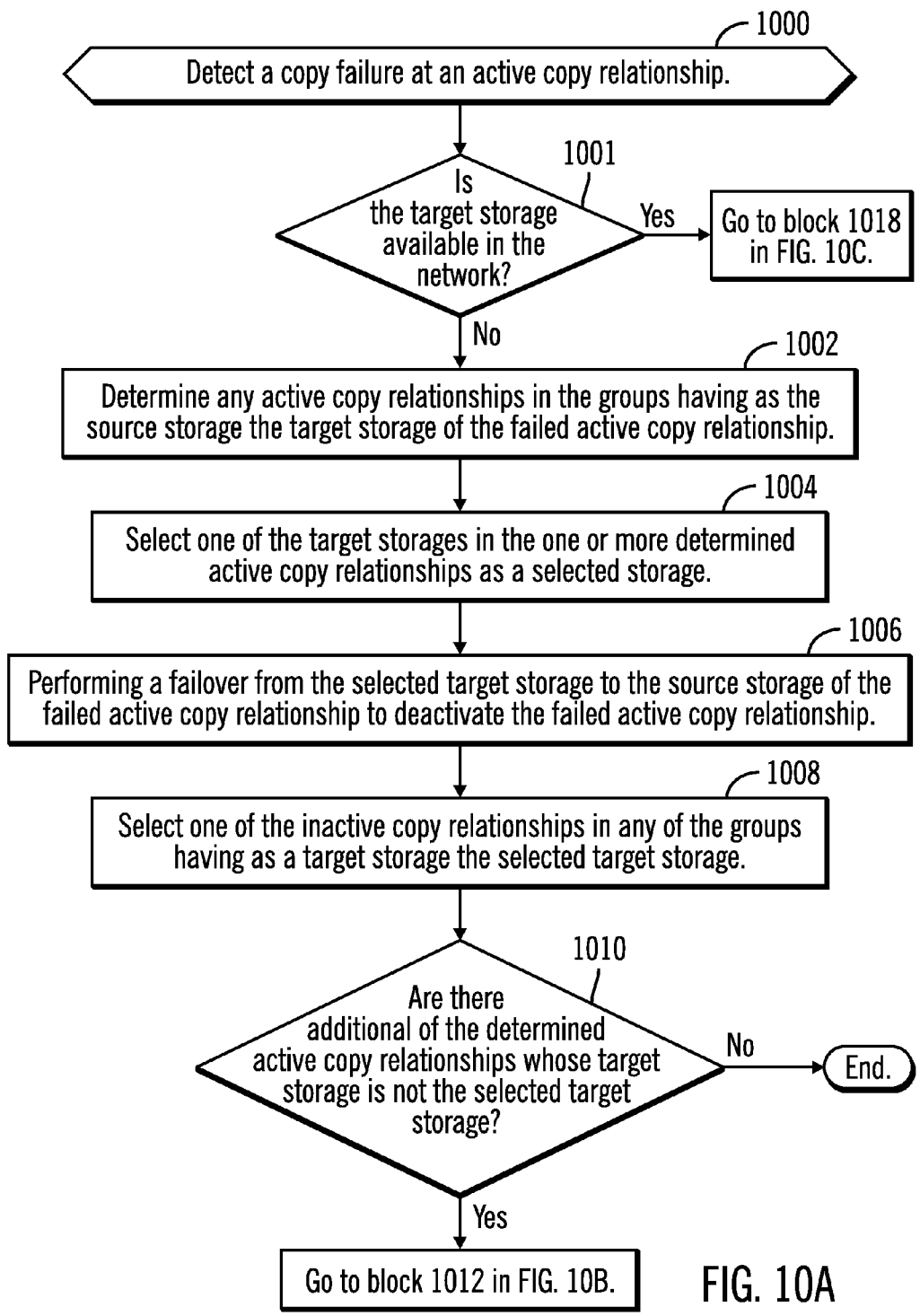

USING INACTIVE COPY RELATIONSHIPS TO RESYNCHRONIZE DATA BETWEEN STORAGES

BACKGROUND OF THE INVENTION

1. Field of the Invention

The present invention relates to a computer program product, system, and method for using inactive copy relationships to resynchronize data between storages.

2. Description of the Related Art

In a storage environment, a storage controller may maintain mirror copy relationships, where a source volume in a mirror copy relationship comprises the storage or volumes from which data is physically copied to a target volume. Failover programs, such as International Business Machines Corporation's ("IBM") HyperSwap® which is a function in the z/OS® operating system, provides continuous availability for disk failures by maintaining the mirror copy relationships to provide synchronous copies of source (primary) disk volumes in one or more storage systems to one or more target (secondary) volumes in one or more storage systems. (HyperSwap is a registered trademark of IBM in countries throughout the world). When a disk failure is detected, code in the operating system identifies HyperSwap managed volumes and instead of failing the I/O request, HyperSwap switches (or swaps) information in internal control blocks so that the I/O request is driven against the target volume of the mirror copy relationship. Since the target volume is an identical copy of the source volume prior to the failure, the I/O request will succeed with no impact to the program issuing the I/O request, which could be an application program or part of the operating system. This therefore masks the disk failure from the program and avoids an application and/or system outage.

A mirror copy relationship may maintain a current and previous bitmaps to keep track of updates at the source volume that need to be copied or synchronized to the target storage. A previous bitmap, also known as an out-of-synch bitmap, indicates updated data in the source volume that occurred in a previous interval, or consistency period, and a current bitmap, also known as a change recording bitmap, which indicates updated data in the source volume that occurred in the current interval or current consistency period. After the replication manager copies all updated data indicated in the previous bitmap, the bitmaps would be toggled to create a new interval, so that the previous bitmap is set to the current bitmap to copy all updated data prior to the new interval, and a new current bitmap would be initialized to record writes in the new interval. In this way, updates that occur while data is being synchronized get recorded without interfering with the synchronization of the writes as of the recent interval.

Further, current mirror copy environments allow for the incremental resynchronization between a first and third site in a three site cascaded configuration (e.g., a first storage synchronizes a source volume to a second storage and then the second storage synchronizes to a further third storage in the cascaded configuration). If there is a failure at the second storage, then the source server may perform resynchronization between the first storage and the third storage, so that the final third storage in the cascade is the new target of the synchronization from the first storage. In order to perform the resynchronization, a pair of change recording bitmaps for the synchronization from the first storage to the third storage is used to track the synchronization of the source data from the second storage to the final third storage. These change recording bitmaps are used during resynchronization, also known as an incremental resynchronization recovery operation, to determine data in the third storage that needs to be resynchronized from the source storage.

SUMMARY

Provided are a computer program product, system, and method for using inactive copy relationships to resynchronize data between storages. A first group of active copy relationships is established to serially copy data among the storages in the first group, wherein each active copy relationship includes synchronization information indicating data to copy from a source storage to a target storage of the active copy relationship. A second group of active copy relationships is stabled to serially copy data among the storages in the second group. Each active copy relationship includes synchronization information indicating data to copy from a source storage to a target storage of the active copy relationship. At least one of the storages in both the first group and the second group comprise overlapping storages that are members of both the first and second groups and at least one of the storages in both the first and second groups comprise non-overlapping storages that are a member of only one of the first and second groups. At least one inactive copy relationship is established having as a source storage one of the non-overlapping storages in the first group and as a target storage one of the non-overlapping storages in the second group. Data is not synchronized from the source storage to the target storage of the inactive copy relationship. Each of the inactive copy relationships includes synchronization information indicating data to copy from the source storage to the target storage of the inactive copy relationship.

BRIEF DESCRIPTION OF THE DRAWINGS

FIGS. 10a, 10b, and 10c illustrate an embodiment of operations to process a failure at one of the storages.

DETAILED DESCRIPTION

Replication environments provide for incremental resynchronization between different sites in a three site cascaded configuration (A->B->C) by use of change recording bitmaps. However, there is a need in the art to provide for resynchronization in a cascaded configuration having multiple cascades forming a tree of storages to allow for resynchronization if any of multiple storages fail.

Described embodiments provide techniques to allow for a resynchronization of any of a plurality of storages in the event of a failure detected at a source storage that was copying data to another storage by maintaining inactive copy relationships between storages in different cascades that are part of a same tree of cascades of storages. The inactive copy relationships track updates to a source storage so that in the event of a failure at another source storage copying data to the target of the inactive copy relationship, the inactive copy relationship may be activated to copy data from the source storage of the inactive copy relationship to the target that is no longer synchronized from the failed storage. With the described embodiments, a target storage of an inactive copy relationship may comprise a storage in a different cascade from the source storage of the inactive copy relationship.

Described embodiments allow for multiple inactive copy relationships to a same target storage from source storages in different cascades of storages that may be selected to resynchronize from any source storage of the inactive copy relationship because the inactive copy relationship tracks updates to a target storage to be updated from a source storage that does not comprise the failed source storage in the inactive copy relationship.

Figure 1:
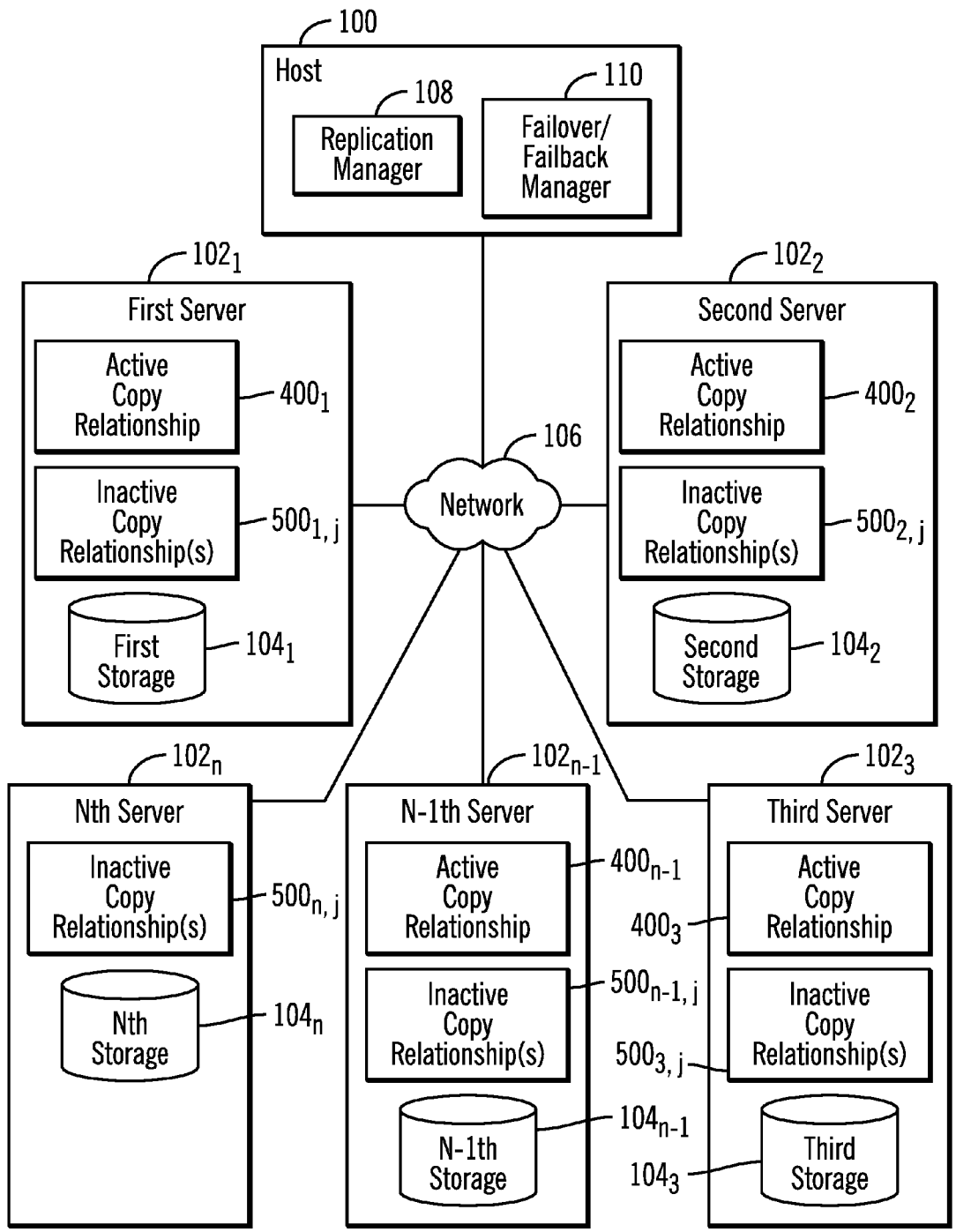
FIG. 1 illustrates an embodiment of a storage replication environment.

FIG. 1 illustrates an embodiment of a replication copy storage environment having a host system $100$ that is connected to a plurality of storage servers $102_1$, $102_2$, $102_3$ . . . $102_n$. Each server $102_1$, $102_2$, $102_3$ . . . $102_n$ manages a corresponding storage $104_2$, $104_3$ . . . $104_n$, respectively, over a network $106$. In one embodiment, data in the first storage $104_1$ is copied to second through nth storages $104_2$, $104_3$ . . . $104_n$ in different servers $102_2$, $102_3$ . . . $102_n$ as part of a series of cascading active copy relationships $400_1$ . . . $400_{n-1}$, where there is an active copy relationship $400_i$, to copy updates to source storage i whose updates are copied to the (i+1) storage, for i=1 to n−1, in the cascade configuration.

The servers $102_1$, $102_2$ . . . $102_{n-2}$ may further include one or more inactive copy relationships $500_{i,j}$, in which i is the source storage $104_i$ and j is the target storage $104_j$. Inactive copy relationships $500_{i,j}$ track updates to source storage $104_i$ that is also a source storage in another active copy relationships $400_i$ whose data is copied to the target storage $104_j$ through intermediate active copy relationships. Thus, the inactive copy relationship $500_{i,j}$ indicates updates to the source storage $104_i$ to be copied to the target storage $104_j$ via another active copy relationship.

In an alternative embodiment, the storages $104_2$, $104_3$ . . . $104_n$ may all be in one storage server. Still further, there may be two or more storages to which the data from another storage is copied. The data subject to the copying from the first storage $104_1$ to the second through nth storages $104_2$, $104_3$ . . . $104_n$ may comprise a volume or other logical unit. The host $100$ and storage servers $102_1$, $102_2$, $102_3$ . . . $102_n$ may communicate over the network $106$. There may be additional hosts (not shown) that provide Input/Output (I/O) requests to the storages $104_1$, $104_3$ . . . $104_n$.

In described embodiments, storages are described as a first storage, second storage, third storage . . . n−1th storage and nth storage, which indicates a storage order in which updates are cascaded from a first storage to a second storage to a third storage and serially all the way to the nth storage.

The first storage $104_1$ may comprise a primary product volume to which data is copied to the other storages $104_2$ . . . $104_n$.

The host system $100$ includes a replication manager $114$ to establish copy relationships $400$, $500$ between the different storages as shown by the active copy relationships $400_1$, $400_2$, $400_3$ . . . $400_{n-1}$ and inactive copy relationships $500_{1,j}$, $500_{2,j}$, $500_{3,j}$ . . . $500_{n-2}$. The active copy relationships $400_1$ are defined to synchronize/copy data from a source storage to a target storage, where for an active copy relationship $400_i$, data is synchronized from the source storage $104_i$ to a target storage $104_{i+1}$ for i=1 to n−1. An active copy relationship $400_2$, $400_3$ . . . $400_{n-1}$ synchronizes data from the source storage to a target storage. An inactive copy relationship $500_1$, $500_2$, $500_3$ . . . $500_{n-2}$ does not actively synchronize data, but indicates the source data of the inactive copy relationship to be synchronized to the target storage when the source storage of the inactive copy relationship is updated. In this way, when an inactive copy relationship is later activated, all the data indicated as updated or needing to be synchronized in the inactive copy relationship may be synchronized from the source to the target identified in the inactive copy relationship.

The host $100$ further includes a failover/failback manager $110$ to use to implement a failover and failback for a source and target storage of a copy relationship. A failover from a first volume to a second volume removes the first volume from the active copy relationship in which the first volume is a target volume. Further, a failback from the source volume to a target volume, removes that failback target volume as a source volume in another copy relationship in which the failback source volume is the target volume, but the failback target volume could be a source volume in copy relationships to target volumes other than the failback source volume.

Figure 2:
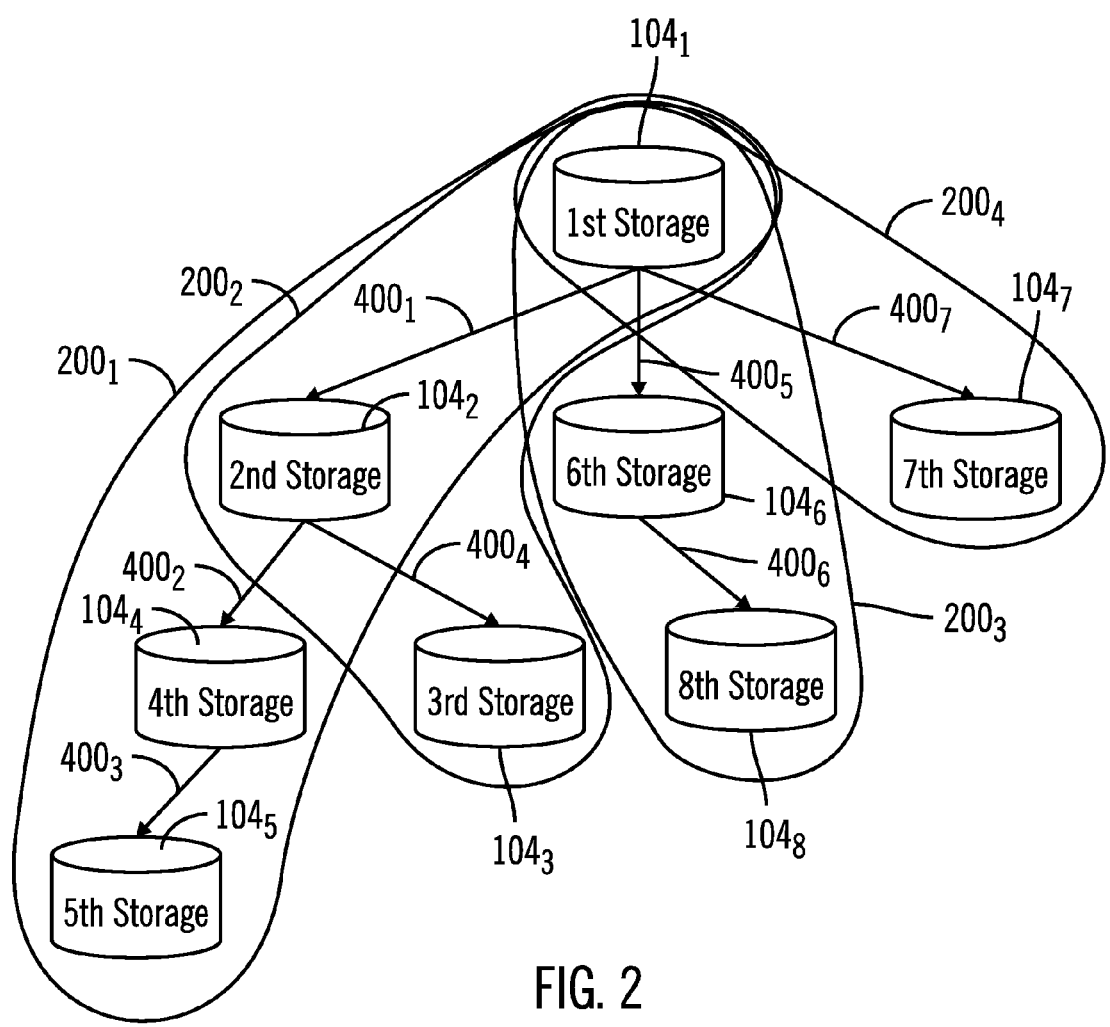
FIG. 2 illustrates an embodiment of a cascaded configuration in the storage replication environment.

FIG. 2 illustrates an embodiment of a tree of cascaded storages, including four cascade groups $200_1$, $200_2$, $200_3$, and $200_4$ from the root storage $104_1$. In the example of FIG. 2, cascade group $200_1$ includes storages $104_1$, $104_2$, $104_4$, and $104_5$, cascade group $200_2$ includes storages $104_1$, $104_2$, and $104_3$, cascade group $200_3$ includes storages $104_1$, $104_6$, $104_8$, and cascade group $200_4$ includes storages $104_1$ and $104_7$. Certain of the storages are overlapping storages, e.g., storages $104_1$ and $104_2$ in that they are included in multiple cascade groups $200_1$ and $200_2$, and other of the storages comprise non-overlapping storages, e.g., $104_3$, $104_4$, $104_5$, $104_6$, $104_8$, $104_7$ in that they are only in one cascade group. In the described embodiments, the different cascade groups form a tree of cascade groups by having a common root storage $104_1$, which receives data from one or more host systems (not shown).

In FIG. 2, each cascade group $200_1$, $200_2$, $200_3$, and $200_4$ includes a plurality of active copy relationships to copy data serially through the storages in the cascade group, from storage-to-storage. For instance cascade group $200_1$ includes active copy relationships $400_1$, $400_2$, $400_3$ to copy data serially through the storages $104_1$, $104_2$, $104_4$, $104_5$; cascade group $200_2$ includes active copy relationships $400_1$, $400_4$ to copy data serially through the storages $104_1$, $104_2$, $104_3$; cascade group $200_3$ includes active copy relationships $400_5$, $400_6$ to copy data serially through the storages $104_1$, $104_6$, $104_8$; and cascade group $200_4$ includes active copy relationship $400_7$ to copy data serially through the storages $104_1$ and $104_7$.

Further, there may also be inactive copy relationships $500_{i,j}$ for each pair of storages in the tree of cascade groups, such that each storage $104$ whose data is indirectly copied to another storage, excluding the storage to which the data is directly copied as a result of the active copy relationship $104_i$, may have inactive copy relationships $500_{i,j}$ from the source storage $104_i$, to target storages 104 not in the active copy relationship $400_i$. There may be inactive copy relationships between storages in the same cascade group and inactive copy relationships having source and target storages in different cascade groups. Further, there may be inactive copy relationships $500_{i,j}$ copying between non-overlapping storages that are only in one cascade group, such as from the third storage $104_3$ to $104_4$, from the third storage $104_3$ to the fifth storage $104_5$, from the fifth storage $104_5$ to the eight storage $104_8$, etc. For storages in different cascade groups $200_1$, $200_2$, $200_3$, and $200_4$, the inactive copy relationships may be in both directions, e.g., $500_{i,j}$ and $500_{j,i}$.

If the source storage in an active copy relationship fails, the inactive copy relationship may be activated to allow resynchronization to the target storage whose source failed. In certain embodiments, the total number of inactive copy relationships that may be formed between pairs of n storages in a tree of cascade groups, e.g., $200_1$, $200_2$, $200_3$, and $200_4$, may comprise the total number of possible inactive copy relationships (which may be expressed as n*(n−1)) minus all active copy relationships, (which may be expressed as (n−1)) minus all upstream relationships within the same cascade group (which may be expressed as the sum of the levels of each of the nodes within the cascade group).

FIG. 2 provides one embodiment or example of a tree of cascade groups, however, in alternative implementations the tree of cascade groups can have any number of cascade groups and storages within the cascade groups.

Figure 3:
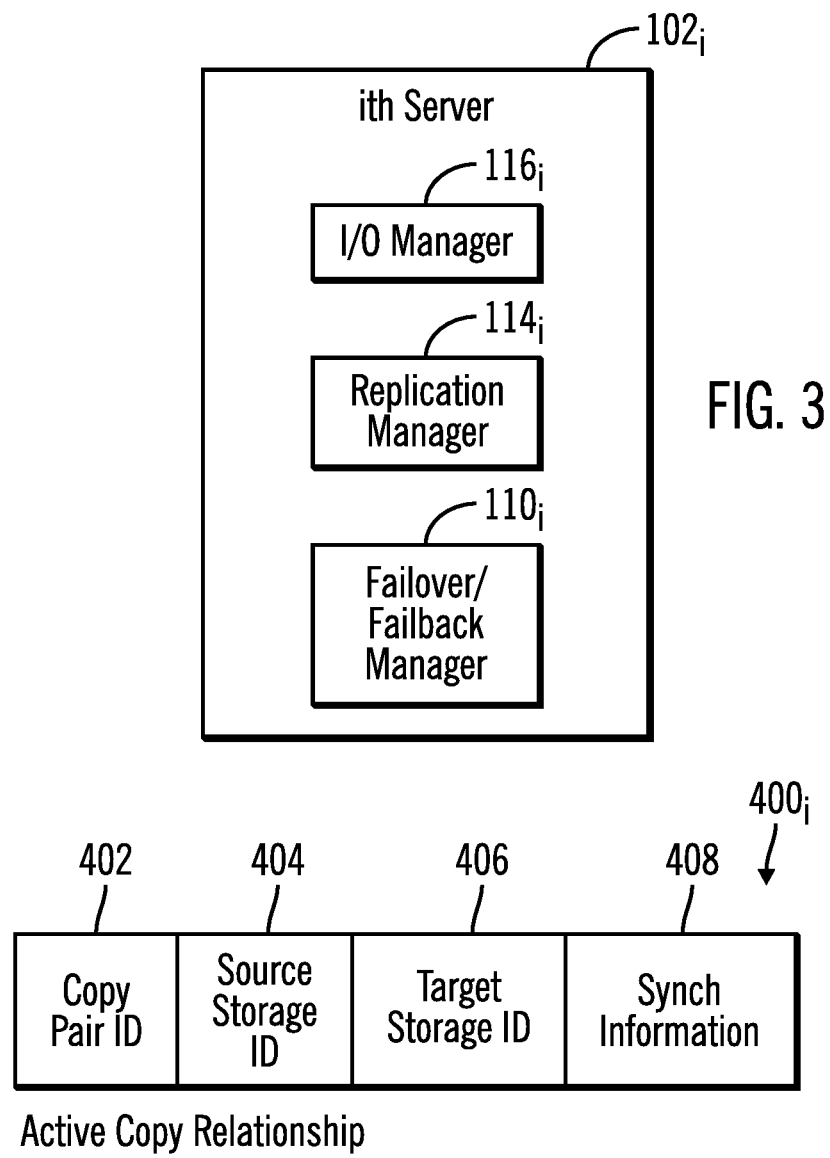
FIG. 3 illustrates an embodiment of a server in the storage replication environment.

FIG. 3 shows an embodiment of a server $102_i$, comprising one of the servers $102_1$, $102_2$, $102_3$ ... $102_n$, as including an Input/Output (I/O) manager $116_i$ to manage I/O requests directed to the storage managed by the server $102_i$, a replication manager $114_i$ to replicate data to another target, and a failback/failover manager $110_i$ to manage failover and failback operations. The server failover/failback manager $110_i$ and replication manager $114_i$ may coordinate replication and failover/failback operations with the host 100. Further operations described as performed by any of the server failover/failback manager 110, $110_i$ may be performed by other components, including other failover/failback managers than those described. The failover/failback manager $110_i$ also establishes and terminates relationships as part of the failback and failover operations.

In one embodiment, the active copy relationships 400 are created by the replication manager 108 in the host 100 and the inactive copy relationships 500 are created by the replication manager $114_i$ on the storage server $102_i$.

The servers $102_1$ ... $102_n$ may comprise an enterprise storage controller/server suitable for managing access to attached storage devices, such as, but not limited to, the International Business Machines Corporation's ("IBM") DS8000® storage system or other vendor storage servers known in the art. (DS8000 is a registered trademark of IBM in countries throughout the world).

In one embodiment, the replication manager 108, $114_i$, comprises a program for managing the mirroring of volumes across systems, such as, but not limited to, the IBM mirroring programs Geographically Dispersed Parallel Sysplex® (GDPS)®, and Tivoli® Storage Productivity Center for Replication (TPC-R) that define a replication session and copy pairs 400. Different types of techniques may be selected to copy the data, such as synchronous mirroring, asynchronous mirroring or point-in-time copying, or combinations of multiple of these different mirroring types. The failover/failback manager 110, $110_i$, may comprise a program suitable for handling failover and failback operations, such as, but not limited to, the IBM HyperSwap product which establishes failover sessions from the established copy pairs. (Geographically Dispersed Parallel Sysplex, GDPS, Tivoli, and HyperSwap are registered trademarks of IBM in countries throughout the world).

The network 106 may comprise a Storage Area Network (SAN), Local Area Network (LAN), Intranet, the Internet, Wide Area Network (WAN), peer-to-peer network, wireless network, arbitrated loop network, etc. The storages $104_1$, $104_2$, $104_3$ ... $104_n$ may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

Figure 4:
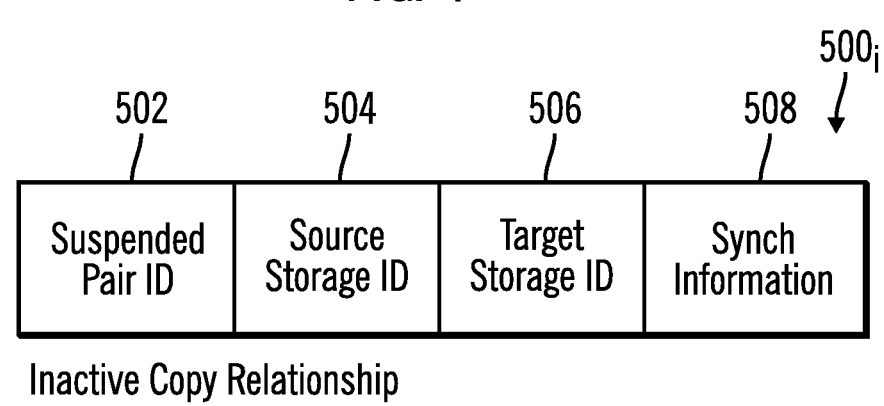
FIG. 4 illustrates an embodiment of an active copy relationship.

FIG. 4 illustrates an embodiment of an instance of an active copy relationship $400_i$, e.g., active copy relationships $400_1$, $400_2$ ... $400_7$, for which data is actively and currently being synchronized as including a copy pair identifier (ID) 402; a source storage identifier (ID) 404, e.g., as a volume or other logic unit identifier, from which data is synchronized/copied; a target storage ID 406, e.g., a volume or other logic unit identifier, to which data is synchronized; and synchronization information 408 indicating data units or tracks in the source storage 404 that need to copied or synchronized to the target storage 406.

Figure 5:
FIG. 5 illustrates an embodiment of an inactive copy relationship.

FIG. 5 illustrates an embodiment of a suspended or inactive copy relationship $500_{i,j}$ as including a suspended pair ID 502 identifying the inactive copy relationship; a source storage ID 504 identifying the source storage $104_i$, from which data will be synchronized when the inactive copy relationship is activated; a target storage ID 506 identifying the target storage 104 to which the source data 504 is copied; and synchronization information 508 indicating data units that need to be copied from the source storage 504 to the target storage 506. The synchronization information 508 may comprise two bitmaps that are toggled as described below.

The synchronization information 408, 508 may comprise bitmaps having array of cells, where each cell indicates one of the data units subject to the copy relationship. In alternative embodiments, the bitmaps may comprise other types of data structures other than arrays used to indicate data units of the copy relationship that have been updated and that need to by synchronized to the target. To toggle bitmaps for the inactive copy relationships, two bitmaps are provided, a previous bitmap for the inactive copy relationship indicates data units that need to be copied from the source storage to the second storage as a result of write operations to the source storage during a previous interval, i.e., previous point-in-time. A current bitmap indicates data units that need to be copied from the source storage to the target storage as a result of write operations to the source storage during a current interval following the previous interval. The toggling may be triggered when all updates from the previous interval indicated in the previous bitmap have been copied from the source storage to the target storage.

To perform the toggling, the previous bitmap for the inactive copy relationship $500_{i,j}$ is discarded. A previous pointer for the previous bitmap is then set to point to the current bitmap for the inactive copy relationship $500_{i,j}$ and a current pointer for the current bitmap is set to point to a new bitmap initialized to indicate nothing to copy, e.g., all zeroes, is allocated. Updates to the source storage following the toggling are then indicated in the new bitmap addressed by the current pointer. In this way, the bitmaps are toggled by adjusting the pointer for the previous bitmap to point to the data structure of the current bitmap, and the pointer for the current bitmap would be adjusted to point to a new empty bitmap.

In one embodiment, the replication manager 108 or $114_i$, may toggle the bitmaps of each inactive copy relationship $500_{i,j}$ by sending a message to all the replication managers $114_i$, on other storage servers $102_2$, $102_3$ . . . $102_n$ to have them toggle any inactive copy relationship bitmaps they manage having a source storage that comprises the target storage of the active copy relationship $500_i$, whose updates from the previous bitmap, i.e., previous interval, have been synchronized.

Figure 6:
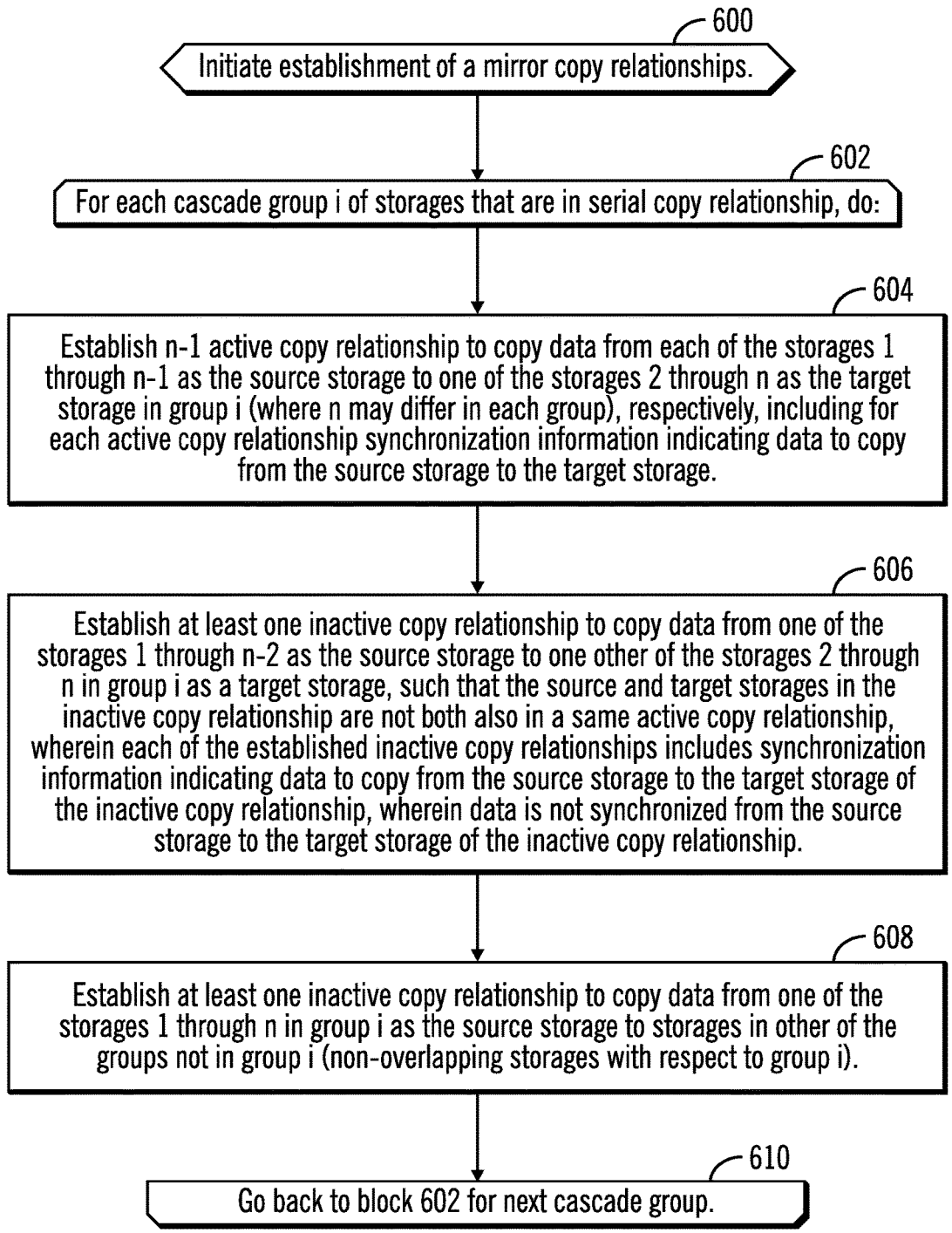
FIG. 6 illustrates an embodiment of operations to establish mirror copy relationships.

FIG. 6 illustrates an embodiment of operations performed by the replication manager 108, $114_i$, to establish the active copy relationships $400_1$ . . . $400_{n-1}$ to implement the cascaded synchronizing operations and the inactive copy relationships $500_1$. These operations of FIG. 6 may each be initiated in response to user entered establish commands via a user interface of the replication manager 108, $114_i$, or automatically executed as part of a script program including the mirror copy relationship establish commands. Upon initiating (at block 600) the operations to establish a mirror copy relationships $400_i$, the replication manager 108, $114_i$ performs a loop of operations at blocks 602 through 610 for each cascade group i, e.g., cascade groups $200_1$, $200_2$, $200_3$, and $200_4$. At block 604, n−1 active copy relationships $400_1$ . . . $400_{n-1}$ are established to copy data from each of the storages $104_1$ through $104_{n-1}$ in cascade group i as the source storage to one of the storages $104_2$ through $104_n$ as the target storage in the cascade group i, respectively. For each created active copy relationship $400_1$ . . . $400_{n-1}$, including synchronization information 408 is generated indicating data to copy from the source storage to the target storage, including updates that need to be synchronized. The variable n may have different values in each of the cascade groups, depending on how many storages are in the cascade group.

The replication manager 108, $114_i$ may further establish (at block 606) at least one inactive copy relationship $500_{i,j}$ to copy data from one of the storages $104_1$ through $104_{n-2}$ as the source storage i to one other of the storages $104_2$ through $104_n$ as a target storage j, such that the source $104_i$ and target storages $104_j$ in the inactive copy relationship $500_{i,j}$ are not both also in a same active copy relationship. Each of the established inactive copy relationships $500_{i,j}$ includes synchronization information indicating data to copy from the source storage $104_i$ to the target storage $104_j$ of the inactive copy relationship. After the inactive copy relationship $500_{i,j}$ is established, data is not synchronized from the source storage $104_i$ to the target storage $104_j$ of the inactive copy relationship, but the synchronization information is updated to indicate data that still needs to be synchronized.

The replication manager 108, $114_i$ may establish (at block 608) at least one inactive copy relationship $500_{i,j}$ to copy data from one of the storages 1 through n in group i as the source storage to storages in other of the groups not in group i (non-overlapping storages with respect to group i), where there may be one inactive copy relationship between the source storage and each of the storages that are only within one other group, i.e., non-overlapping storages not in cascade group i.

Figure 7:
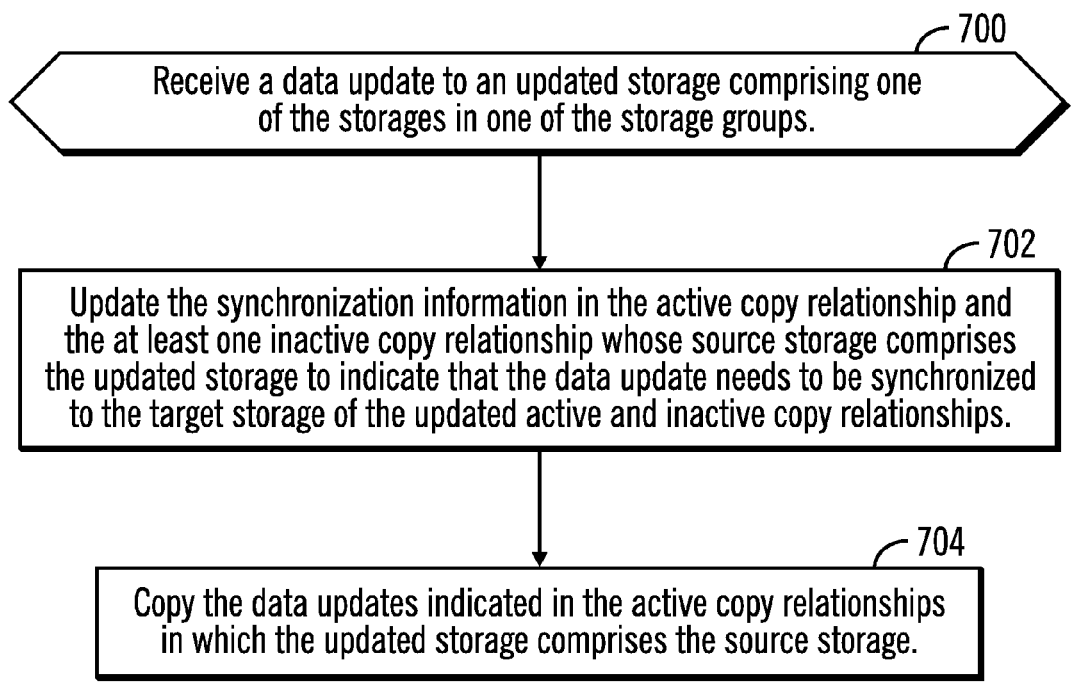
FIG. 7 illustrates an embodiment of operations to process an update to data at the source storage in an active copy relationship.

FIG. 7 illustrates an embodiment of operations by the I/O manager 116 and/or replication manager 108, $114_i$ to process an update to data an updated storage $104_i$ comprising one of the storages $104_1$ . . . $104_n$. The operations may be performed by the replication manager $114_i$ in the server $102_i$ including the storage $104_i$ that was updated, which may comprise a primary/production server or another server. Upon receiving (at block 700) the update to the data in the storage $104_n$, the synchronization information 408 for the active copy relationship $400_i$ and each of the inactive copy relationships $500_{i,j}$ whose source storage comprises the updated storage $104_i$ are updated (at block 702) to indicate that the updated data needs to be synchronized to the target storage of the updated active $400_i$ and inactive $500_{i,j}$ copy relationships. The replication manager $114_i$ copies (at block 704) the update to the data in the source storage $104_i$ to the target storage $104_{i+1}$ indicated in the active copy relationship $400_i$. However, the inactive copy relationships do not cause the copying of the updated data to the target storages $104_j$ indicated in the inactive copy relationships $500_{i,j}$.

With the operations of FIG. 7, the synchronization information 508 in the inactive copy relationships $500_{i,j}$ are updated to indicate updated data in the storage $104_i$, so that when the inactive copy relationship $500_{i,j}$ is activated and used for resynchronization as part of a failback procedure, the updated data will be synchronized to or from the target storage of the activated inactive copy relationship to ensure proper resynchronization of the storage's data.

Figure 8:
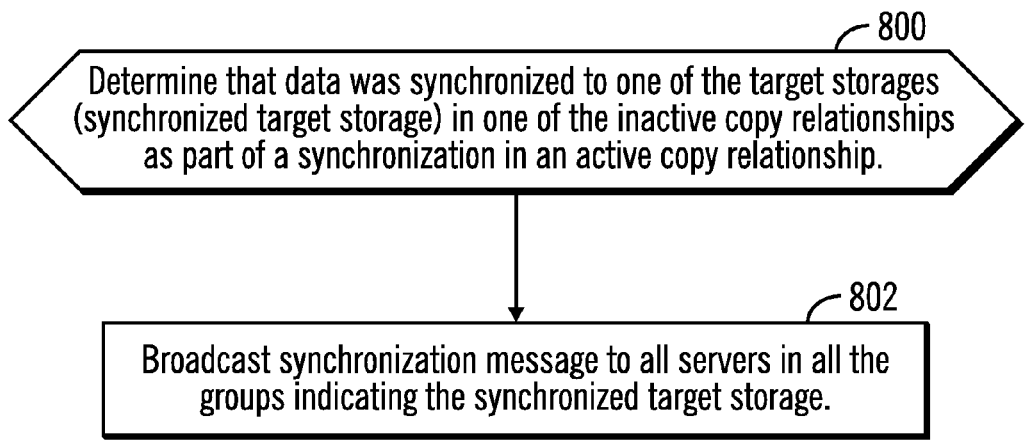
FIG. 8 illustrates an embodiment of operations to track synchronization for an inactive copy relationship.

FIG. 8 illustrates an embodiment of operations performed by a replication manager 108, $114_j$ managing one or more inactive copy relationship $500_{i,j}$, such as the replication manager $114_j$, to update the synchronization information 508 in the inactive copy relationships $500_{i,j}$ whose target storage $104_j$ was updated with data from the source storage $104_{j-1}$ of an active copy relationship $400_{j-1}$. In one embodiment, the source server $102_{j-1}$ having the source storage 104 may send a message when copying data to the target storage $104_j$ to other servers that have an inactive copy relationship $500_{i,j}$ including storage $104_j$ as the target storage. Upon determining (at block 800) that data was synchronized to one of the target storages $104_j$ in one of the inactive copy relationships $500_{i,j}$ from a source storage $104_{j-1}$ of an active copy relationship $400_{j-1}$, the replication manager $114_i$ managing the inactive copy relationship $500_{i,j}$ broadcasts (at block 802) synchronization messages to all the servers $102_1$ . . . $102_n$ in all the groups, which would indicate the target storage that was synchronized.

In one embodiment, to broadcast, the server for the source of the relationship that synchronized sends a message to each of its servers having storages in active copy relationships including upstream and downstream servers except the server of the target of that synchronized. Each server receiving the message further forwards the message to its connected servers except the server it received the message from.

Figure 9:
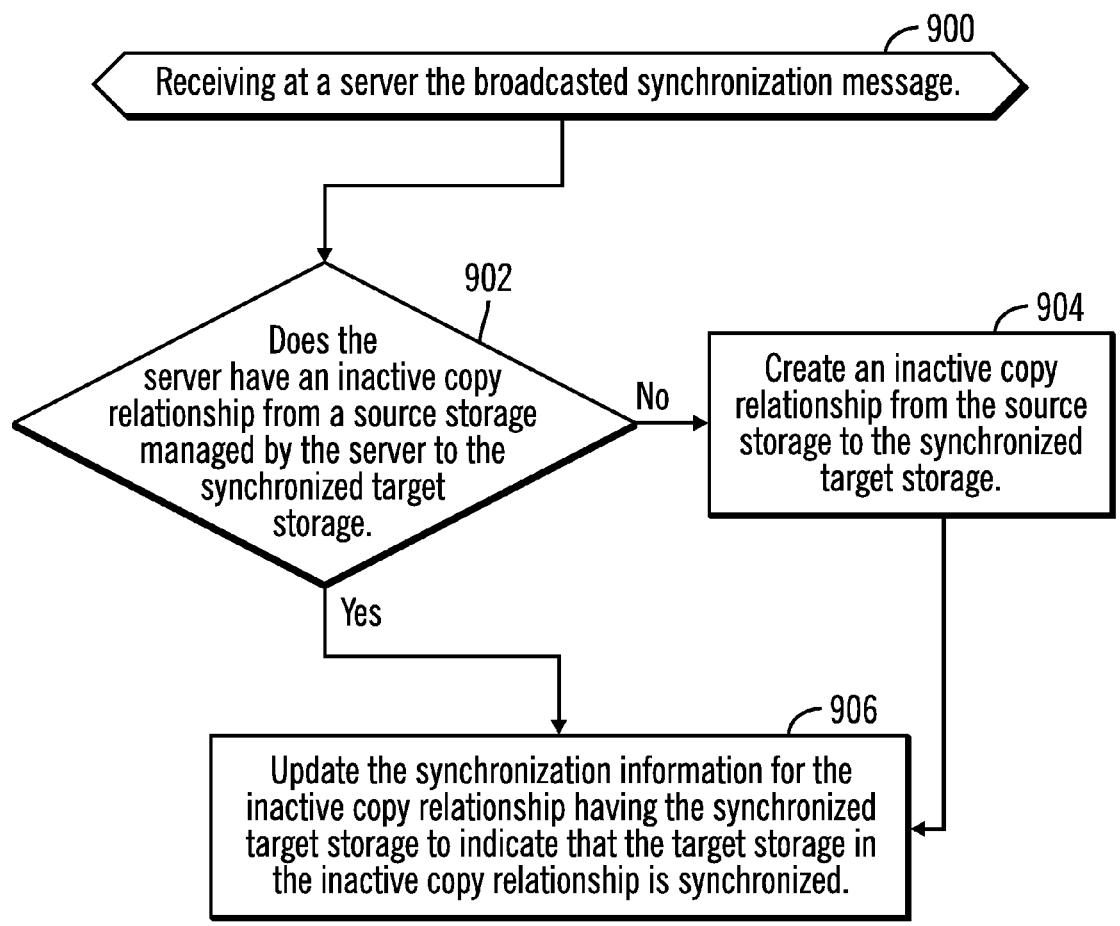
FIG. 9 illustrates an embodiment of operations to process a broadcasted synchronization message at one of the servers.

FIG. 9 illustrates an embodiment of operations performed by the replication managers $114_i$ in a server $102_i$ receiving a synchronization broadcast, according to FIG. 8, indicating a synchronized target storage $104_j$ that has been synchronized as part of an active copy relationship. Upon receiving the broadcasted synchronization message (at block 900) that out-of-sync data from a point-in-time was synchronized, the replication manager $114_i$ determines (at block 902) whether the receiving server $102_i$ is managing an inactive copy relationship $500_{i,j}$ from a source storage $104_i$ managed by the server $102_i$ to the synchronized target storage $104_j$. In certain embodiments, if there is no such inactive synchronization relationship (from the no branch of block 902), the replication manager $114_i$ creates (at block 904) an inactive copy relationship $500_{i,j}$ from the source storage $104_i$ to the synchronized target storage $104_j$. After creating (at block 904) the inactive copy relationship $500_{i,j}$ or if there is already such an inactive copy relationship $500_{i,j}$ (from the yes branch of block 902), the replication manager $114_i$ updates (at block 906) the synchronization information 508 for the inactive copy relationship $500_{i,j}$ having the synchronized target storage $104_j$ to indicate that the target storage $104_j$ in the inactive copy relationship is synchronized.

With the described embodiments of FIGS. 8 and 9, inactive copy relationships $500_{i,j}$ are managed so that if the target $104_j$ is updated as a consequence of another active copy relationship $400_1 \ldots 400_{n-1}$, the synchronization information 508 in the inactive copy relationships $500_{i,j}$ are updated to indicate that source data does not need to be synchronized from the source storage $104_i$ to its target $104_j$.

Figure 10B:
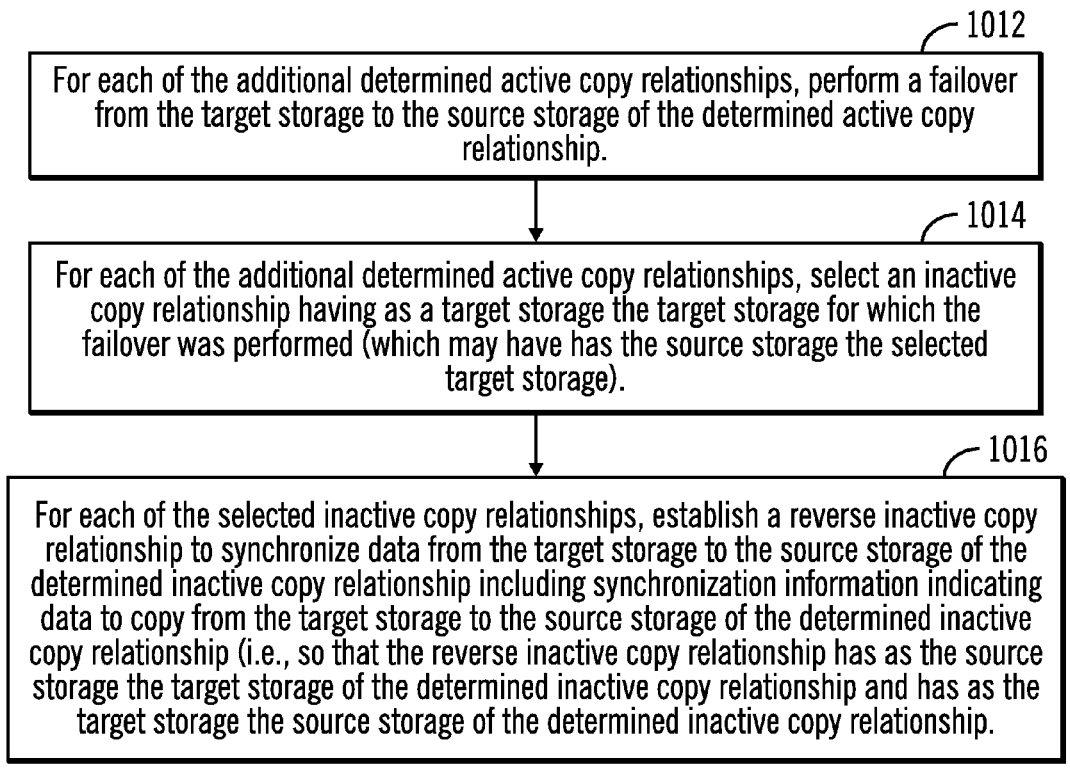
Figure 10C:
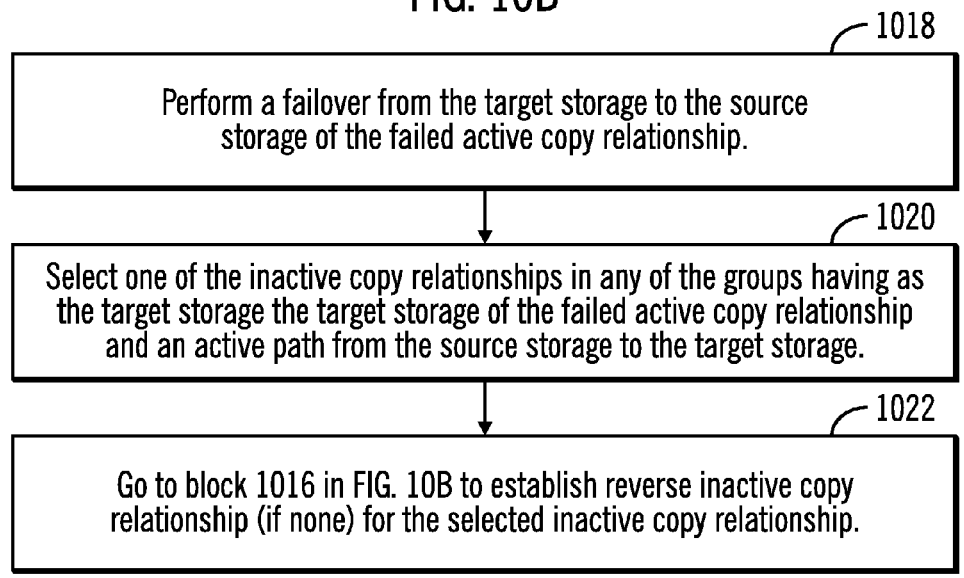

FIGS. 10a, 10b, and 10c illustrate an embodiment of operations by a failover/failback manager 110, $110_i$ to process the copy relationships when a copy failure is detected for a copy relationship $400_k$. The copy failure may result from a failure at a source storage $104_k$ in an active copy relationship $400_k$ to copy to the target storage $104_{kk}$, which may occur if the target storage $104_{kk}$ does not respond or responds with a failure. The failure may be at one of the storages $104_k$, $104_{kk}$ in the active copy relationship $400_k$ and/or a failure in the network 106 connection between the servers having the source and target storages. Upon detecting (at block 1000) a failure to copy for an active copy relationship $400_k$, a determination is made (at block 1001) whether the target storage $104_{kk}$ of the failed active copy relationship $400_k$ is available in the network 106, such that data from one of the storages 104 in an inactive copy relationship may be copied to the target storage $104_{kk}$ of the failed active copy relationship $400_k$. If the target storage $104_{kk}$, e.g., $104_2$, is not available, then a determination is made (at block 1002) of any active copy relationships in the groups having as the source storage the target storage $104_{kk}$ of the failed active copy relationship. For instance, if active copy relationship $400_1$ fails and target storage $104_2$ is unavailable, then the determined active copy relationships comprise $400_2$ and $400_4$. Selection is made (at block 1004) of one of the target storages in the one or more determined active copy relationships, e.g., storage $104_3$.

To change the flow of how data is copied in the tree of cascade groups to address the failed active copy relationship and unavailable target storage $104_{kk}$, a failover is performed (at block 1006) from the selected target storage to the source storage of the failed active copy relationship to deactivate the failed active copy relationship, e.g., failover from storage $104_3$ to $104_1$. A failover is also performed (at block 1008) from the one or more target storages in the determined active copy relationships not having the selected target storage to the source storage of the determined active copy relationship, e.g., failover from $104_4$ to $104_2$, to deactivate the determined active copy relationships, e.g., $400_2$.

To reroute the flow of copying to the selected target storage, e.g., $104_3$, selection is made (at block 1008) of one of the inactive copy relationships in any of the cascade groups $200_1$, $200_2$, $200_3$, and $200_4$ having as a target storage the selected target storage, e.g., $104_3$. If (at block 1010) there are additional of the determined active copy relationships whose target storage is not the selected target, e.g., $400_2$, then control proceeds to block 1012 in FIG. 10b, to perform, for each of the additional determined active copy relationships, a failover from the target storage to the source storage of the determined active copy relationship, e.g., a failover from $104_4$ to $104_2$ to deactivate the active copy relationship $400_2$. For each of the additional determined active copy relationships, e.g., $400_2$, selection is made (at block 1014) of an inactive copy relationship having as a target storage the target storage for which the failover was performed (which may have as the source storage the selected target storage).

For each of the selected inactive copy relationships, a reverse inactive copy relationship is established (at block 1016) to synchronize data from the target storage to the source storage of the determined inactive copy relationship including synchronization information indicating data to copy from the target storage to the source storage of the determined inactive copy relationship (i.e., so that the reverse inactive copy relationship has as the source storage the target storage of the determined inactive copy relationship and has as the target storage the source storage of the determined inactive copy relationship).

The failovers deactivate the failed active copy relationship $400_k$. The reverse inactive copy relationships $500_{j,k}$ tracks updates to the target storage $104_j$ of the determined inactive copy relationship $500_{i,j}$, including synchronization information 508 indicating data to copy from the target storage $104_j$ to the source storage $104_k$ of the determined inactive copy relationship $500_{i,j}$. In this way, the reverse inactive copy relationship has as the source storage the target storage of the determined inactive copy relationship and has as the target storage the source storage of the determined inactive copy relationship.

If (at block 1001) the target storage of the failed active copy active copy relationship $400_k$ is available, then control proceeds to block 1018 in FIG. 10c to reroute copying to the available target storage $104_{kk}$ of the failed copy relationship $400_k$, e.g., target storage $104_2$ in the example. At block 1018, a failover is performed from the target storage $104_{kk}$ to the source storage $104_k$ of the failed active copy relationship $400_k$, e.g., from target storage $104_2$ to source storage $104_1$. Selections is made (at block 1020) of one of the inactive copy relationships $500_{i,j}$ in any of the groups having as the target storage the target storage $104_{kk}$ of the failed active copy relationship and having an active path in the network 104 from the source storage $104_i$, to the target storage $104_{kk}$. Control then proceeds to block 1016 in FIG. 10b to establish a reverse inactive copy relationship (if there is not one already) for the selected inactive copy relationship $500_{i,j}$. Thus, with the operations of FIG. 10c, if the targets storage $104_{kk}$ of the failed active copy relationship $400_k$ is available on some network path, then that target storage may still remain in the copy paths.

After the failover operation of FIGS. 10a, 10b, 10c there are now two inactive copy relationships $500_{i,j}$ and $500_{j,i}$ for the storage $104_j$ to which the failed source storage $104_k$ copied data. These two inactive copy relationships $500_{i,j}$ and $500_{j,i}$ track any changes that may happen to either storages $104_i$ and $104_j$ that may occur between the failover and the completion of the failback so that any inadvertent writes to the storage $104_j$ do not lead to data inconsistencies.

Figure 11:
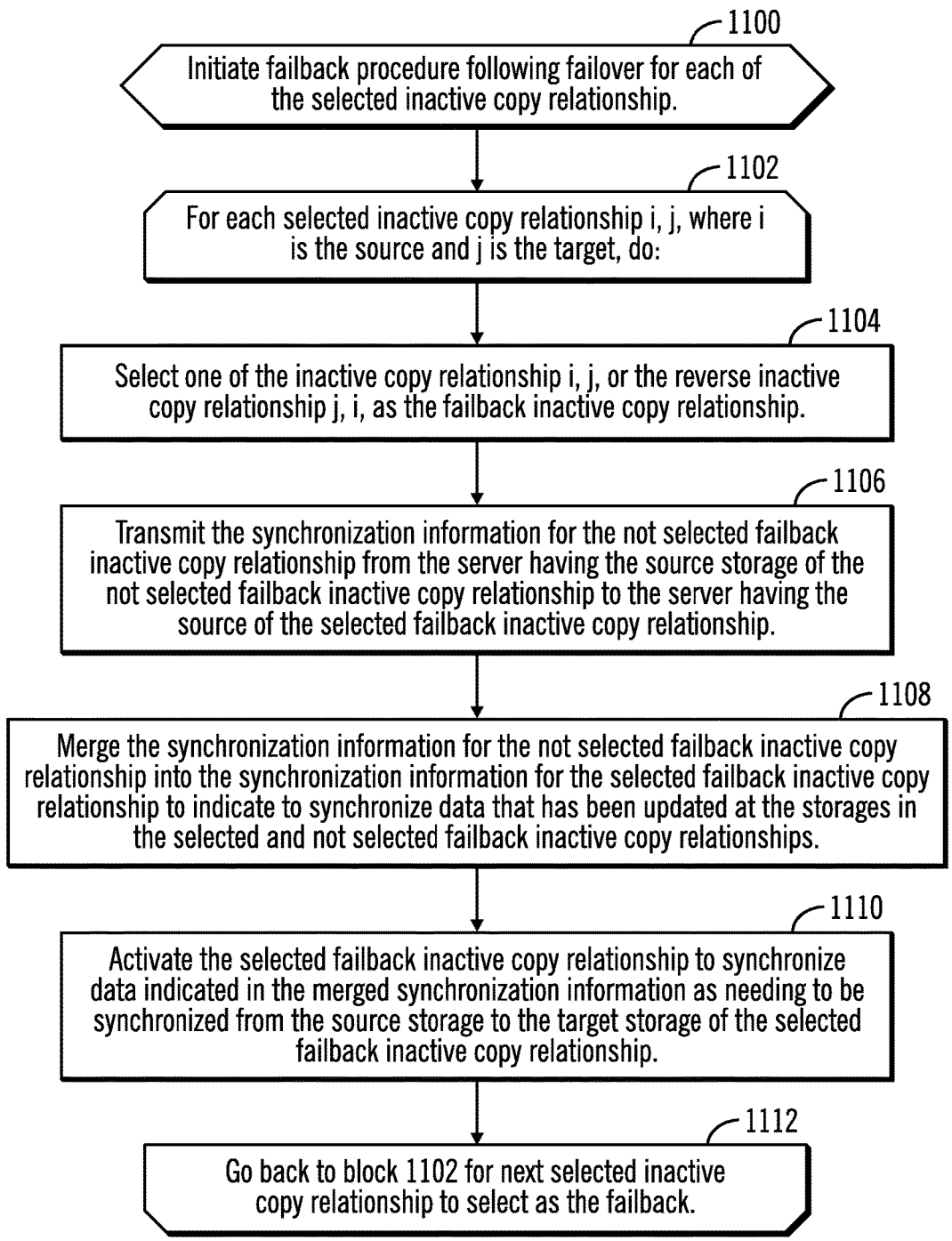
FIG. 11 illustrates an embodiment of operations to perform a failback.

FIG. 11 illustrates an embodiment of operations performed by the failover/failback manager 110, $110_i$ to perform failback for the failovers performed according to FIGS. 10a, 10b, and 10c. Upon initiating (at block 1100) a failback procedure for each of the selected inactive copy relationships $500_{i,j}$ selected according to the operations FIGS. 10a, 10b, 10c as having the one or more targets of the active copy relationships that were deactivated, the failover/failback manager 110, $110_i$ performs a loop of operations at blocks 1102 through 1112 for each selected inactive copy relationship $500_{i,j}$. At block 1104, selection is made of one of the selected inactive copy relationship $500_{i,j}$ or the reverse of the selected inactive copy relationship $500_{j,i}$ to use as the failback inactive copy relationship to resynchronize the data. Thus, the selection at block 1104 is a selection of a failback inactive copy relationship to use from the selected inactive copy relationship $500_{i,j}$ or the reverse of the selected inactive copy relationship $500_{j,i}$. The synchronization information 508 for the not selected failback inactive copy relationships ($500_{i,j}$ or $500_{j,i}$) is transmitted (at block 1106) from the server having the source storage of the not selected failback inactive copy relationship ($500_{i,j}$ or $500_{j,i}$) to the server having the source of the selected failback inactive copy relationship. The synchronization information for the not selected failback inactive copy relationship is merged (at block 1108) into the synchronization information for the selected failback inactive copy relationship to indicate to synchronize data that has been indicated as updated at the storages $104_i$ and $104_j$. In one embodiment, the merge comprises a logical OR operation on the bits for the data units in the synchronization information, e.g., bitmaps, of the determined and reverse inactive copy relationships. The selected failback inactive copy relationship is activated (at block 1110) to synchronize data indicated in the merged synchronization information as needing to be synchronized from the source storage to the target storage of the selected inactive copy relationship. After activating the failback inactive copy relationship ($500_{i,j}$ or $500_{j,i}$), the other non-selected failback inactive copy relationship is terminated.

With the described embodiments, the synchronization information for the selected failback inactive copy relationships ($500_{i,j}$ or $500_{j,i}$) are merged, so that if the target of the selected failback inactive copy relationship is updated before the failback, its updated data will be overwritten when the source data of the selected failback inactive copy relationship is synchronized back to the target. This insures data integrity so that updates to the target of the selected inactive copy relationship not made to the source do not remain after synchronization, which if they did remain would result in the copies being out-of-synchronization.

Described embodiments provide techniques to use multiple inactive copy relationships to track changes so that if a resynchronization needs to be performed from one of the storages to another, an inactive copy relationship to a target storage updated by a failed source storage may be selected to provide another source storage to use to synchronize that target storage. Further, a reverse inactive copy relationship may be created to use to track changes to the target storage after a failover and before failback is initiated to make sure that updates to the target storage are overwritten by source storage during resynchronization.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the hosts 100 and storage servers $102_1$, $102_2$ . . . $102_n$ may be implemented in one or more computer systems, such as the computer system 1202 shown in FIG. 12. Computer system/server 1202 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1202 may be practiced in distributed cloud computing environments where tasks are performed by remote processing devices that are linked through a communications network. In a distributed cloud computing environment, program modules may be located in both local and remote computer system storage media including memory storage devices.

Figure 12:
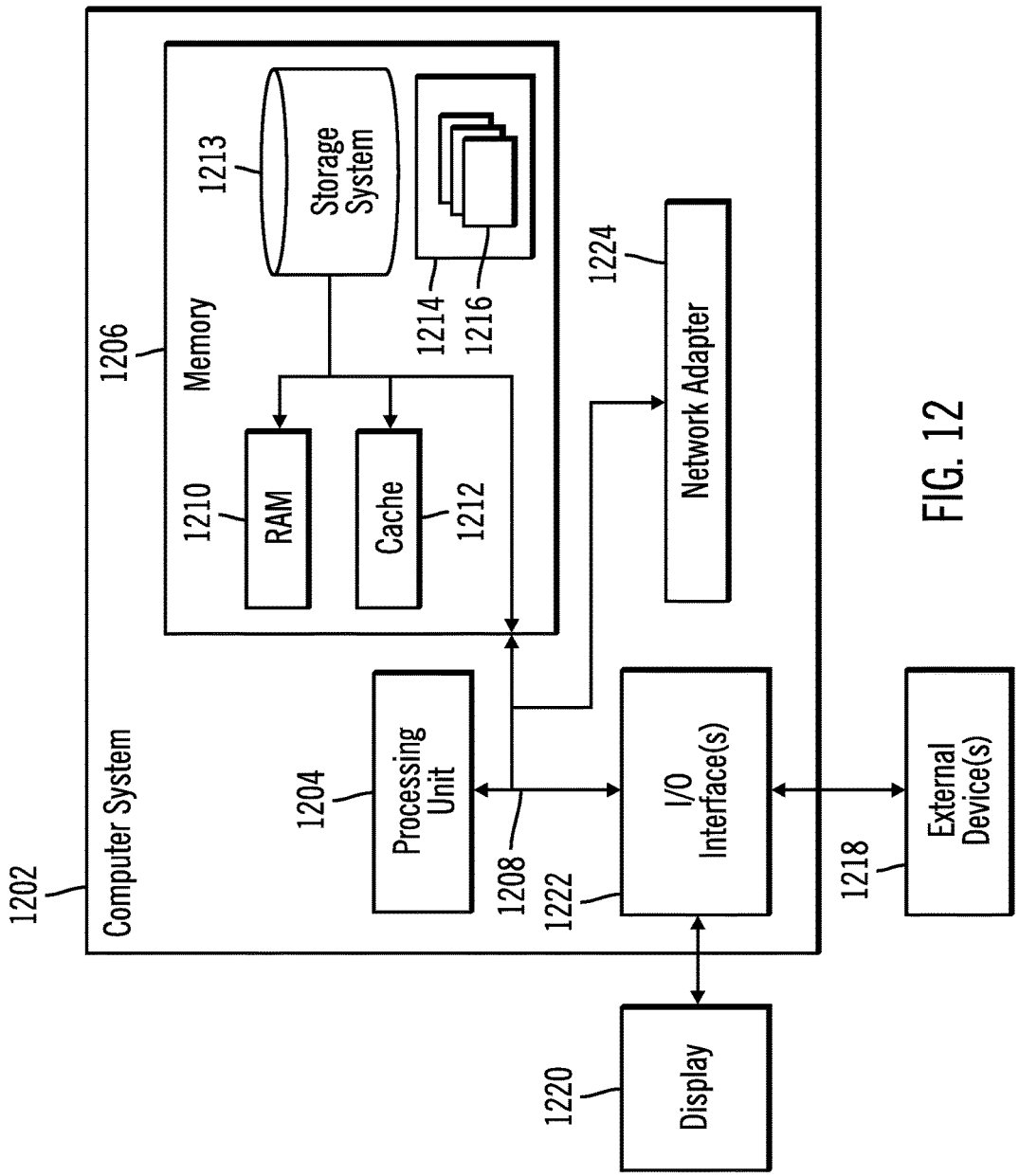
FIG. 12 illustrates a computing environment in which the components of FIG. 1 may be implemented.

As shown in FIG. 12, the computer system/server 1202 is shown in the form of a general-purpose computing device. The components of computer system/server 1202 may include, but are not limited to, one or more processors or processing units 1204, a system memory 1206, and a bus 1208 that couples various system components including system memory 1206 to processor 1204. Bus 1208 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1202 typically includes a variety of computer system readable media. Such media may be any available media that is accessible by computer system/server 1202, and it includes both volatile and non-volatile media, removable and non-removable media.

System memory 1206 can include computer system readable media in the form of volatile memory, such as random access memory (RAM) 1210 and/or cache memory 1212. Computer system/server 1202 may further include other removable/non-removable, volatile/non-volatile computer system storage media. By way of example only, storage system 1213 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1208 by one or more data media interfaces. As will be further depicted and described below, memory 1206 may include at least one program product having a set (e.g., at least one) of program modules that are configured to carry out the functions of embodiments of the invention.

Program/utility 1214, having a set (at least one) of program modules 1216, may be stored in memory 1206 by way of example, and not limitation, as well as an operating system, one or more application programs, other program modules, and program data. Each of the operating system, one or more application programs, other program modules, and program data or some combination thereof, may include an implementation of a networking environment. The components of the computer 1202 may be implemented as program modules 1216 which generally carry out the functions and/or methodologies of embodiments of the invention as described herein. The systems of FIG. 1 may be implemented in one or more computer systems 1202, where if they are implemented in multiple computer systems 1202, then the computer systems may communicate over a network.

Computer system/server 1202 may also communicate with one or more external devices 1218 such as a keyboard, a pointing device, a display 1220, etc.; one or more devices that enable a user to interact with computer system/server 1202; and/or any devices (e.g., network card, modem, etc.) that enable computer system/server 1202 to communicate with one or more other computing devices. Such communication can occur via Input/Output (I/O) interfaces 1222. Still yet, computer system/server 1202 can communicate with one or more networks such as a local area network (LAN), a general wide area network (WAN), and/or a public network (e.g., the Internet) via network adapter 1224. As depicted, network adapter 1224 communicates with the other components of computer system/server 1202 via bus 1208. It should be understood that although not shown, other hardware and/or software components could be used in conjunction with computer system/server 1202. Examples, include, but are not limited to: microcode, device drivers, redundant processing units, external disk drive arrays, RAID systems, tape drives, and data archival storage systems, etc.

The reference characters used herein, such as i and n, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer implemented method implemented in a host system coupled to storages and including a processor for copying data among storages, comprising:
    establishing a first group of active copy relationships to serially copy data among the storages in a first group of the storages, wherein each active copy relationship includes synchronization information indicating data to copy from a source storage to a target storage of the active copy relationship;
    establishing a second group of active copy relationships to serially copy data among the storages in a second group of the storages, wherein each active copy relationship includes synchronization information indicating data to copy from a source storage to a target storage of the active copy relationship, wherein at least one of the storages in both the first group and the second group comprise overlapping storages that are members of both the first and second groups and wherein at least one of the storages in both the first and second groups comprise non-overlapping storages that are a member of only one of the first and second groups; and
    establishing at least one inactive copy relationship having as a source storage one of the non-overlapping storages in the first group and as a target storage one of the non-overlapping storages in the second group, wherein data is not synchronized from the source storage to the target storage of the at least one inactive copy relationship, and wherein each of the at least one inactive copy relationship includes synchronization information indicating data to copy from the source storage to the target storage of the inactive copy relationship.

2. The method of claim 1, wherein the first and second groups of the storages comprise groups of cascaded storages forming a tree of cascaded groups, each of the cascaded groups having a same root storage of the storages.

3. The method of claim 1, wherein the source storage and the target storage of one of the at least one inactive copy relationship are target storages in different active copy relationships having one of the overlapping storages as the source storage.

4. The method of claim 1, further comprising:
    in response to detecting a failure to copy at one of the storages comprising the source storage of a failed active copy relationship comprising one of the active copy relationships when the target storage is available, activating a selected inactive copy relationship of the at least one inactive copy relationship having as a target storage the target storage of the failed active copy relationship to synchronize data from the source storage to the target storage of the selected inactive copy relationship.

5. The method of claim 1, further comprising:
    in response to detecting a failure to copy at one of the storages comprising the source storage to the target storage of a failed active copy relationship comprising one of the active copy relationships when the target storage is unavailable, performing:
        deactivating any of the active copy relationships in the first and the second groups having as the source storage the target storage of the failed active copy relationship; and activating one of the at least one inactive copy relationship having as the target storage the target storage of one of the deactivated active copy relationships.

6. A system for copying data among storages, comprising:
a processor; and
a computer readable storage medium having program code that when executed by the processor performs operations, the operations comprising:
establishing a first group of active copy relationships to serially copy data among the storages in a first group of the storages, wherein each active copy relationship includes synchronization information indicating data to copy from a source storage to a target storage of the active copy relationship;
establishing a second group of active copy relationships to serially copy data among the storages in a second group of the storages, wherein each active copy relationship includes synchronization information indicating data to copy from a source storage to a target storage of the active copy relationship, wherein at least one of the storages in both the first group and the second group comprise overlapping storages that are members of both the first and second groups and wherein at least one of the storages in both the first and second groups comprise non-overlapping storages that are a member of only one of the first and second groups; and
establishing at least one inactive copy relationship having as a source storage one of the non-overlapping storages in the first group and as a target storage one of the non-overlapping storages in the second group, wherein data is not synchronized from the source storage to the target storage of the at least one inactive copy relationship, and wherein each of the at least one inactive copy relationship includes synchronization information indicating data to copy from the source storage to the target storage of the inactive copy relationship.

7. The system of claim 6, wherein the first and second groups of the storages comprise groups of cascaded storages forming a tree of cascaded groups, each of the cascaded groups having a same root storage of the storages.

8. The system of claim 6, wherein the source storage and the target storage of one of the at least one inactive copy relationship are target storages in different active copy relationships having one of the overlapping storages as the source storage.

9. The system of claim 6, wherein the operations further comprise:
in response to detecting a failure to copy at one of the storages comprising the source storage of a failed active copy relationship comprising one of the active copy relationships when the target storage is available, activating a selected inactive copy relationship of the at least one inactive copy relationship having as a target storage the target storage of the failed active copy relationship to synchronize data from the source storage to the target storage of the selected inactive copy relationship.

10. The system of claim 6, wherein the operations further comprise:
in response to detecting a failure to copy at one of the storages comprising the source storage to the target storage of a failed active copy relationship comprising one of the active copy relationships when the target storage is unavailable, performing:
deactivating any of the active copy relationships in the first and the second groups having as the source storage the target storage of the failed active copy relationship; and
activating one of the at least one inactive copy relationship having as the target storage the target storage of one of the deactivated active copy relationships.

11. A computer program product for copying data among storages, wherein the computer program product comprises a computer readable storage medium having program instructions embodied therewith, the program instructions executable by a processor to cause operations, the operations comprising:
establishing a first group of active copy relationships to serially copy data among the storages in a first group of the storages, wherein each active copy relationship includes synchronization information indicating data to copy from a source storage to a target storage of the active copy relationship;
establishing a second group of active copy relationships to serially copy data among the storages in a second group of the storages, wherein each active copy relationship includes synchronization information indicating data to copy from a source storage to a target storage of the active copy relationship, wherein at least one of the storages in both the first group and the second group comprise overlapping storages that are members of both the first and second groups and wherein at least one of the storages in both the first and second groups comprise non-overlapping storages that are a member of only one of the first and second groups; and
establishing at least one inactive copy relationship having as a source storage one of the non-overlapping storages in the first group and as a target storage one of the non-overlapping storages in the second group, wherein data is not synchronized from the source storage to the target storage of the at least one inactive copy relationship, and wherein each of the at least one inactive copy relationship includes synchronization information indicating data to copy from the source storage to the target storage of the inactive copy relationship.

12. The computer program product of claim 11, wherein the first and second groups of the storages comprise groups of cascaded storages forming a tree of cascaded groups, each of the cascaded groups having a same root storage of the storages.

13. The computer program product of claim 11, wherein the source storage and the target storage of one of the at least one inactive copy relationship are target storages in different active copy relationships having one of the overlapping storages as the source storage.

14. The computer program product of claim 11, wherein for one of the at least one inactive copy relationship, the source storage of the inactive copy relationship is the target storage of one of the active copy relationships having one of the overlapping storages as the source storage and wherein the target storage of the inactive copy relationship is the target storage of another one of the active copy relationships having one of the non-overlapping storages as the source storage.

15. The computer program product of claim 11, wherein for an inactive copy relationship of the at least one inactive copy relationship, the source storage of the inactive copy relationship is the target storage of one of the active copy relationships having one of the non-overlapping storages as the source storage and wherein the target storage of the inactive copy relationship is the target storage of another one of the active copy relationships having one of the non-overlapping storages as the source storage.

16. The computer program product of claim 11, wherein for an inactive copy relationship of the at least one inactive copy relationship, the source storage of the inactive copy relationship is the target storage of one of the active copy relationships having one of the non-overlapping storages as the source storage and wherein the target storage of the inactive copy relationship is the target storage of another one of the active copy relationships having one of the overlapping storages as the source storage.

17. The computer program product of claim 11, wherein the operations further comprise:
  in response to detecting a failure to copy at one of the storages comprising the source storage of a failed active copy relationship comprising one of the active copy relationships when the target storage is available, activating a selected inactive copy relationship of the at least one inactive copy relationship having as a target storage the target storage of the failed active copy relationship to synchronize data from the source storage to the target storage of the selected inactive copy relationship.

18. The computer program product of claim 11, wherein the operations further comprise:
  in response to detecting a failure to copy at one of the storages comprising the source storage to the target storage of a failed active copy relationship comprising one of the active copy relationships when the target storage is unavailable, performing:
    deactivating any of the active copy relationships in the first and the second groups having as the source storage the target storage of the failed active copy relationship; and
    activating an inactive copy relationship of the at least one inactive copy relationship having as the target storage the target storage of one of the deactivated active copy relationships.

19. The computer program product of claim 18, wherein the deactivating of the active copy relationships comprises performing a failover from the target storage of the active copy relationship to deactivate to another storage from which data is copied to the target storage through at least one of the active copy relationships, and wherein the activating of the inactive copy relationship comprises performing a failback from the source storage to the target storage of the inactive copy relationship or from the target storage to the source storage.

20. The computer program product of claim 18, wherein the deactivated active copy relationships include a first deactivated active copy relationship including a first non-overlapping storage in the first group as the target storage of the first deactivated active copy relationship and a second deactivated active copy relationship including a second non-overlapping storage in the second group as the target storage of the second deactivated copy relationship, and wherein the activated inactive copy relationship comprises a first inactive copy relationship having has as the target storage the first non-overlapping storage, wherein the operations further comprise:
  activating a second inactive copy relationship having as the source storage the first non-overlapping storage and having as the target storage the second non-overlapping storage.

21. The computer program product of claim 20, wherein the first inactive copy relationship is selected of the at least one inactive copy relationship having as the target storage the first non-overlapping storage to minimize a minimum number of activations of the at least one inactive copy relationship that need to be performed to reroute synchronizing of data to operational storages in the first and second groups.

22. The computer program product of claim 11, wherein the operations further comprise:
  receiving a data update to an updated storage comprising one of the storages in at least one of the first and second groups;
  copying the data update from the updated storage to the target storage of the active copy relationship in which the updated storage comprises the source storage; and
  updating the synchronization information for any of the at least one inactive copy relationship having the target storage updated with the data update to indicate that the data update does not need to be synchronized to the target storage.

23. The computer program product of claim 22, wherein the updating the synchronization information for any of the at least one inactive copy relationship comprises:
  in response to synchronizing data from the source storage to the target storage in one of the active copy relationships resulting in a synchronized target storage, broadcasting a message to servers managing the storages in the first and second groups to cause each server, having an inactive copy relationship whose target storage comprises the synchronized target storage, to set the synchronization information to indicate that data does not need to be copied from the source storage to the target storage of the inactive copy relationship.

24. The computer program product of claim 23, wherein the broadcasted message causes each of the servers to create an inactive copy relationship having as the source storage a storage managed by the server and as the target storage the synchronized target storage in response to the server not having an inactive copy relationship whose target storage comprises the synchronized target storage.

25. The computer program product of claim 11, wherein the operations further comprise:
  in response to a failure at one of the storages comprising the source storage of a failed active copy relationship comprising one of the active copy relationships, determining a determined inactive copy relationship of the at least one inactive copy relationship having as a target storage the target storage of the failed active copy relationship; and
  establishing a reverse inactive copy relationship to synchronize data from the target storage to the source storage of the determined inactive copy relationship including synchronization information indicating data to copy from the target storage to the source storage of the determined inactive copy relationship.

* * * * *